United States Patent [19]

Feder et al.

[11] Patent Number: 4,650,126

[45] Date of Patent: Mar. 17, 1987

[54] PROCESS FOR AMBIENT TEMPERATURE GRINDING OF SOFT POLYMERS

[75] Inventors: Fred R. Feder, Collierville, Tenn.; Arthur W. Opsahl, Wilmington, Del.; Kenneth N. Yarbrough, Orange, Tex.

[73] Assignee: E. I. Du Pont de Nemours and Company, Wilmington, Del.

[21] Appl. No.: 775,366

[22] Filed: Sep. 12, 1985

Related U.S. Application Data

[63] Continuation-in-part of Ser. No. 686,520, Dec. 26, 1984, abandoned.

[51] Int. Cl.$^4$ .............................................. B02C 19/12
[52] U.S. Cl. ....................................... 241/22; 241/23; 241/24
[58] Field of Search .................. 241/261.2, 23, 261.3, 241/16, 22, 24, 80, 97, DIG. 31

[56] References Cited

U.S. PATENT DOCUMENTS

| | | |
|---|---|---|
| 2,895,939 | 7/1959 | Stober et al. . |
| 3,190,565 | 6/1965 | Jayne . |
| 3,232,543 | 2/1966 | Pasteka . |
| 3,648,937 | 3/1972 | Ehrreich . |
| 3,687,699 | 8/1972 | Prosser et al. . |
| 4,157,790 | 6/1979 | Benn et al. . |

FOREIGN PATENT DOCUMENTS

| | | |
|---|---|---|
| 52154 | 4/1979 | Japan . |
| 109614 | 8/1980 | Japan . |

Primary Examiner—Mark Rosenbaum

[57] ABSTRACT

Soft and tacky polymers can be ground at ambient temperature in the presence of a grinding aid in an atttrition mill having counter-rotating grinding elements operated above a minimum tip speed (170 m/sec) and at a throughput of more than about 90 kg/hr, the amount of grinding aid, which can be either organic or inorganic such as calcium carbonate, being about 5-20% based on the weight of polymer. The mill temperature is adjusted so that nearly all of the grinding aid is retained on the softened polymer particles, thus improving polymer flow and reducing to a minimum the amount of loose grinding aid to be disposed of. Air is drawn through the mill to serve as the material carrier medium and at the same time to cool the mill, if required. However, a portion of the exiting air can be recirculated to the mill to increase the temperature, if needed.

14 Claims, 4 Drawing Figures

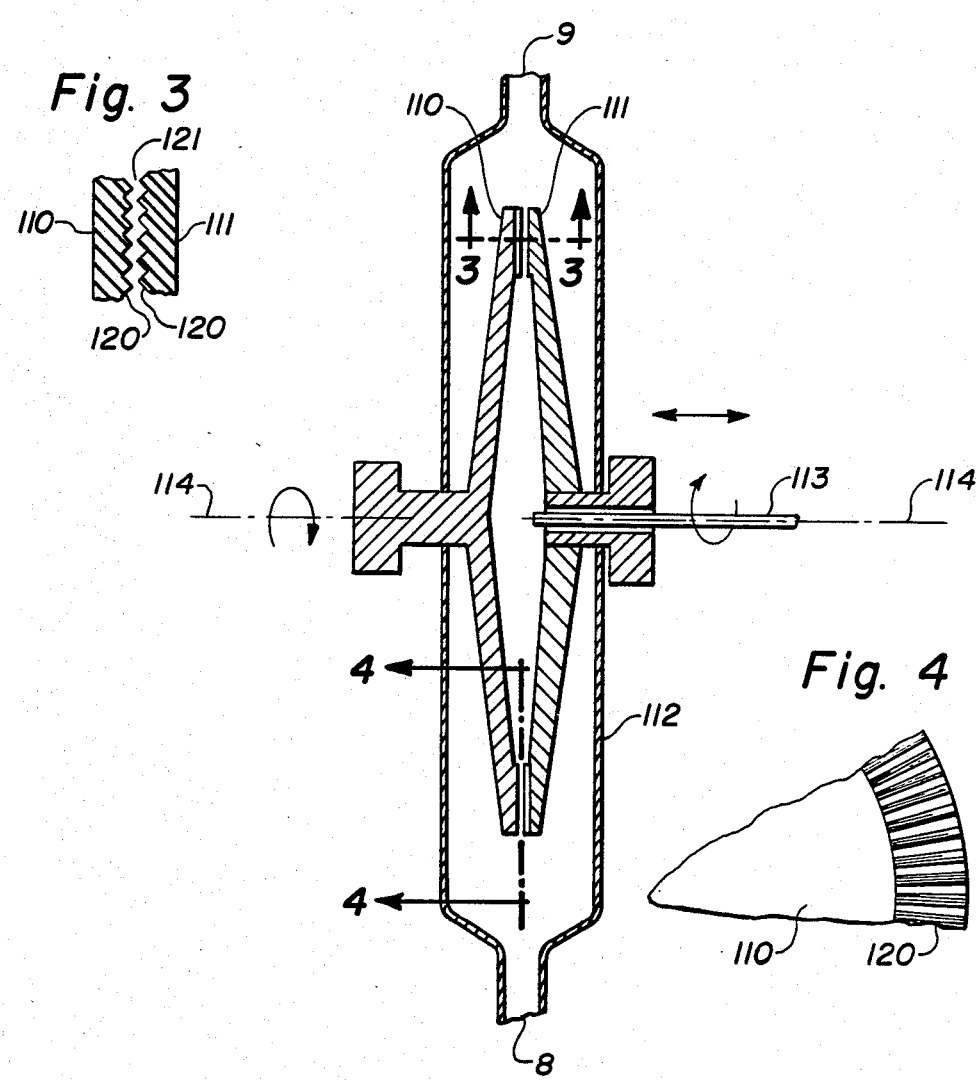

PROCESS FOR AMBIENT TEMPERATURE GRINDING OF SOFT POLYMERS

CROSS-REFERENCE TO RELATED APPLICATION

This is a continuation-in-part of our copending application Ser. No. 686,520, filed Dec. 26, 1984 now abandoned.

BACKGROUND OF THE INVENTION

1. Field of the Invention

This invention relates to a process for the ambient temperature grinding of soft polymers in the presence of a grinding aid.

2. State of the Art

It is often desired to produce polymer powders or small granules for use in polymer compounding, especially for blending with other polymers to modify or improve their properties. A typical example of such an application is the use of an ethylene/vinyl acetate/carbon monoxide terpolymer as a modifier of polyvinyl chloride, as described in U.S. Pat. No. 3,780,140 to Hammer.

Grinding of soft and sticky polymers at ambient temperature often is difficult or even impossible because of the reagglomeration of the small particles produced into larger aggregates and because of sticking of the material to the grinding equipment. One way to solve this problem is to grind soft polymers using liquid nitrogen as the cooling medium. This process, known as cryogenic grinding, is quite expensive. In addition, it is practical only in equipment of a rather limited size, which can process only a relatively small amount of polymer per unit of time.

Another prior art method calls for the addition to the polymer of a grinding aid, which adheres to the surfaces of the polymer particles and thus reduces their tackiness and prevents or reduces their reagglomeration into larger aggregates. See, for example, U.S. Pat. Nos. 3,190,565 to Jayne and 3,648,937 to Ehrreich; Japanese patent application No. 79/52,154 to Nitto Electric Industries; and Japanese patent application No. 80/109,614 to Matsushita Electric Works. Grinding in the presence of a powdered organic polymeric additive or of an inorganic powder is carried out at room temperature. This process is of interest when the presence of the grinding aid is not detrimental to the final product.

Grinding at ambient temperature in the presence of a grinding aid has some drawbacks, which make this technique impractical for commercial production. First, the grinding rate is quite slow, and thus the throughput of the material often is unsatisfactory. Second, the process requires elaborate dust collection and recycling equipment because a large proportion of the grinding aid is not effectively attached to the polymer particles and must be recovered. There is a need, therefore, for an ambient temperature grinding process, where those prior art drawbacks would be eliminated.

SUMMARY OF THE INVENTION

According to this invention, there is now provided a process for grinding a soft and tacky polymeric material in the presence of a grinding aid at ambient temperature, wherein grinding is carried out in an attrition mill having counter-rotating grinding elements rotating at a tip speed of at least about 170 m/sec, air being passed through the mill at a flow rate of at least about 350 m$^3$ per kg of polymer throughput, the polymer throughput being more than about 90 kg of polymer per hour, the amount of grinding aid being about 5–20% based on the weight of the polymer; the mill being set so that about 1–40% of the polymer fed to the mill is recycled as oversize material, which material added to the feed preheats the feed stream to a selected temperature at or above ambient; and a portion of the air exiting from the mill is recycled to the incoming air, when it is desired to further increase the temperature;

the grinding temperature being such that the surfaces of polymer particles melt, thus allowing the grinding aid to well adhere thereto and minimizing the amount of loose grinding aid to be disposed of;

most loose grinding aid being removed with the air flowing through the attrition mill and optionally collected at the exit from the mill.

For the purpose of this description and claims, "tip speed" is the speed of a point on the periphery of a grinding element of the attrition mill relative to the speed of a point on the periphery of a counter-rotating grinding element of the mill (thus, the sum of both peripheral speeds).

The term "grinding at ambient temperature" means that grinding is conducted at a temperature at least equal to that of the surrounding air. It is realized, however, that the actual temperature within the mill normally will be higher than the temperature of the surrounding air, even though some cooling (e.g., with fresh air drawn through the mill) may be taking place. "Grinding at ambient temperature" thus is a term used in the industry to distinguish from "cryogenic grinding".

BRIEF DESCRIPTION OF THE DRAWINGS

FIG. 2 is a schematic diagram of an attrition mill suitable in the process of this invention.

FIG. 3 is a cross-section along line 3—3 of FIG. 2.

FIG. 4 is the view of a portion of a grinding element of FIG. 4.

DETAILED DESCRIPTION OF THE INVENTION

Figure 1:
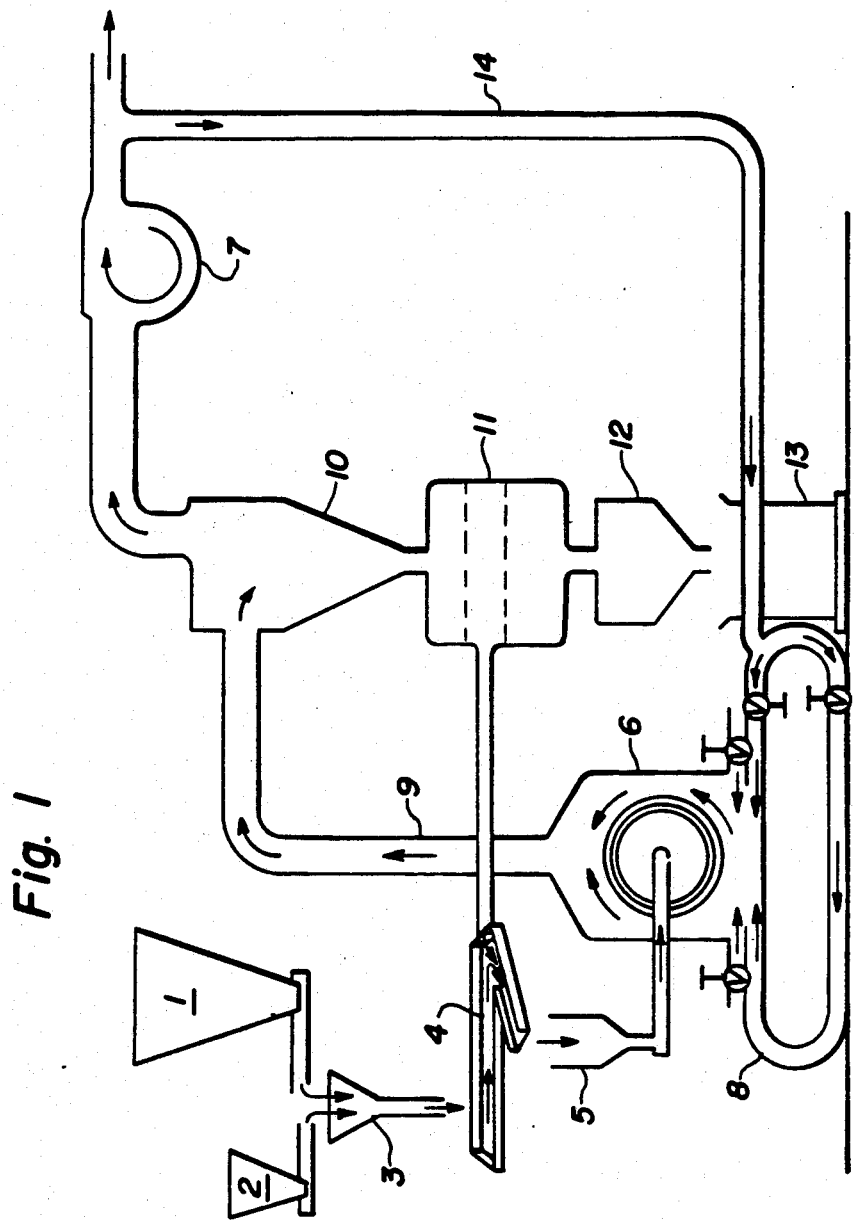
FIG. 1 is a schematic flow diagram of the preferred embodiment of the process of this invention.

Any soft and sticky polymer which is sufficiently thermally stable to be processed at the operating temperature without chemical degradation can be ground according to the process of this invention. Representative polymers include ethylene/vinyl acetate copolymers, ethylene/vinyl acetate/carbon monoxide terpolymers, ethylene/methacrylic acid copolymers and their salts, ethylene/methyl methacrylate copolymers, ethylene/n-butyl acrylate/carbon monoxide terpolymers, copolyamides, vinylidene fluoride/hexafluoropropylene copolymers, copolyetheresters, poly(oxymethylene), chlorinated polyethylene, etc.

The grinding aid can be a polymer powder, where the polymer has a melting temperature higher than the process temperature and remains free-flowing at that temperature, or it can be an inorganic material. Organic polymers used for this purpose preferably are crystalline or at least have some crystallinity because such polymers usually are easier to grind to a powder than substantially amorphous polymers. Typical such materials include, for example, polypropylene, polyvinyl chloride, poly(hexamethyleneadipamide), and poly(ethylene terephthalate). Inorganic grinding aids include, for example, silica, calcium carbonate, zinc oxide, magnesium oxide, clay, etc. Calcium carbonate is preferred because it is readily available at a moderate cost, is chemically inert, and can be readily reduced to any desired mesh size. The grinding aid particles should be smaller, preferably much smaller, than the desired polymer particle size. The optimum grinding aid particle size is about 75 μm or so. The preferred amount of the grinding aid is about 6 to 12% based on the weight of the polymer.

A typical process according to this invention is illustrated in the flow diagram of FIG. 1. Polymer pellets are fed from hopper 1, while powdered grinding aid is fed from hopper 2. Both feeds are delivered through funnel 3 to trough 4 and are fed to hopper 5, from which they are introduced to the center of attrition mill 6. Air is drawn through attrition mill 6 by means of fan 7. It enters attrition mill 6 through air intake 8 and exits through the top of the mill and conduit 9. The exiting air carries with it powdered polymer as well as excess grinding aid, which are separated from each other in cyclone separator 10. Grinding aid is removed to a baghouse filter (not shown), while powdered polymer falls on a screen in shaker screen box 11. Oversize polymer particles are recycled to the feed trough 4, while powdered polymer product of the correct size is collected in container 13 via packaging hopper 12. A portion of exhaust air, which is at a higher temperature than the incoming air, is returned to the attrition mill via conduit 14.

The screen size in shaker screen box 11 can be varied according to the desired polymer particle size and the amount of resulting recycle. The usual particle size is less than 1 mm in diameter and preferably about 0.5 mm (500 μm) or less. The preferred amount of recycle is 1-20% of polymer feed. When the recycle is more than 40%, the process tends to be uneconomical; when it is less than 1%, the particle size uniformity may be unsatisfactory.

It has been observed that operating outside the process conditions recited in the foregoing Summary of the Invention either failed to produce satisfactory material; or resulted in a large amount of grinding aid remaining loose, clogging the filters and requiring frequent stoppages; or provided low, commercially impractical throughputs; or was energetically inefficient. The present process, however, is very efficient from the standpoint of grinding rates, use of grinding aid, quality of polymeric product obtained, and total energy requirements.

This invention is now illustrated by the following examples of certain preferred embodiments thereof, where all parts, proportions, and percentages are by weight, unless otherwise indicated. All measurements and units not originally obtained in SI have been converted to SI units.

The attrition mill was a Wedco 22-inch (559 mm) model schematically shown in FIG. 2, having two vertical counter-rotating, circular plates 110 and 111; the feed side grinding plate 111 rotating at 4,200 rpm, and the opposite grinding plate 110 rotating at 3600 rpm, the tip speed being 228 m/sec. The mill had housing 112 designed for minimum particle contact in the effluent stream under high air flow conditions. The mill was fed at the center of plate 111 through feed pipe 113. Air was drawn in at the bottom of housing 112, through intake 8, flowed around and between the grinding plates, and entrained the mill effluent, which was removed at the top through conduit 9. Both grinding plates had teeth to improve grinding efficiency. Those teeth were formed by milling the flat portions around the periphery of the plates so as to radially cut alternating triangular grooves and lands, in a shape of saw teeth which extended over a length of about 10 cm or so. The teeth could be sharpened by grinding and deepening the grooves. Grinding plate 111 could be moved along axis 114 to either increase or decrease the mill gap, that is, the distance between the teeth of both plates.

FIG. 3 shows a cross-section through both grinding plates 110 and 111. Teeth 120 are cut in both grinding plates, which are separated from each other by distance 121 (the mill gap).

FIG. 4 shows a portion of grinding plate 111 along line 4—4, as seen from the inside of the attrition mill. Teeth 120 are placed radially on the periphery of the plate as shown, spaced about 8.67 teeth per centimeter of circumference.

In all the examples, the amount of product recycle was between 1 and 20% of polymer feed, unless otherwise indicated. The particle sizes of grinding aids were sufficiently small to satisfy the process requirements.

EXAMPLE 1

The polymer pellets subjected to grinding were Product A (a terpolymer of 71% ethylene, 26% vinyl acetate, and 3% carbon monoxide). The polymer had a melt index (MI) equal to 0.2 g/10 min and a crystalline melting point of 69° C.

Pellets of Product A were mixed in a drum tumbler with 0, 5 and 10% by weight of calcium carbonate (Pfizer, Superpflex 200 ®) and fed to the attrition mill. Mill parameters (mill gap, temperature, power consumption) were varied over the available ranges to achieve maximum grinding rates for the production of material passing through 30 mesh (600 μm) screen. Air flow was from about 1780 m³/kg to 3500 m³/kg. Intake ambient air temperature ranged from 29° to 36° C. (no air recycled). It was found that:

1. The mill would not grind Product A with 0% calcium carbonate. The material melted in the mill.
2. The mill would grind Product A with 5% of calcium carbonate at a maximum rate of 216 lbs/hr (98 kg/hr), with good adhesion of grinding aid. Attempts to raise rates resulted in material melting in the mill.
3. The mill would grind Product A with 10% calcium carbonate at a maximum rate between 540 and 620 lbs/hr (245 and 281 kg/hr), limited by the feed system. No mill melting limit was reached. The calcium carbonate appeared to be completely adhered to the ground product; hence, no exhaust air filtration limit was determined.

As a comparison control, the pellet mixture containing 10% of calcium carbonate was fed to a horizontal, 28-inch (711 mm) single-plate rotating Wedco attrition mill operated at 3600 rpm and a tip speed of 135 m/sec, with air flow of about 1800 m³/kg of polymer, at a melt-limited rate of about 260–300 lbs/hr (118–136 kg/hr). This resulted in a markedly lower adhesion of calcium carbonate to the ground product, resulting in very high exhaust air filter loadings.

EXAMPLE 2

The polymer pellets subjected to grinding were:
a. Product A, as above defined;

b. Product B (a terpolymer of 68-74% ethylene, 19-22% vinyl acetate and 7-10% carbon monoxide), having an MI of 10-25 g/10 min and a crystalline melting point of about 66° C. (This was an experimental product.)

Calcium carbonate (Pfizer, Superpflex 200®) was metered into a metered stream of polymer pellets to be ground, and this mixture was subsequently mixed with the oversize recycle from the process. The resulting mixture was fed to the attrition mill. Mill parameters were established to yield maximum grinding rates for the production of material passing through selected mesh screens (30 to 40 mesh) (600 to 450 μm). Calcium carbonate feed rate was varied so that there was about 10% excess of calcium carbonate not retained on the product. Ambient temperature ranged from 7° to 24° C. over these experiments (no recycled air). Air flow was from 1780 m³/kg to 2400 m³/kg. Mill gap varied from 1-1.6 mm, with consequent oversize recycled at 1-10% of the feed. The following results were obtained:

1. Sustained rates of at least 500 lbs/hr (227 kg/hr) were obtained for grinding Product A to 30 mesh (600 μm) with 7% of calcium carbonate retained on the product. Exhaust air filtration requirements were minimal (no dust).
2. A rate of 380 lbs/hr (172 kg/hr) was obtained in preparing 2000 lbs (907 kg) of 40 mesh (425 μm) Product A with 8% of calcium carbonate retained.
3. Product B was successfully ground through 30 mesh (600 μm) with 7% of calcium carbonate retained. The indicated rate was 380-500 lbs/hr (172-227 kg/hr) while preparing 1000 lbs (454 kg).

In the above example, the amount of calcium carbonate retained on the product was established by ash determination.

EXAMPLE 3

The polymer pellets subjected to grinding were:
a. Product C (a zinc salt of a copolymer of 9% of methacrylic acid and 91% of ethylene, neutralized to about 18%), having an MI of 5 and a crystalline melting point of 98° C.
b. Product D (a zinc salt of a copolymer of 15% of methacrylic acid and 85% of ethylene, neutralized to about 22%), having MI=10-20 and a crystalline melting point of 93° C.
c. Product E (a sodium salt of a copolymer of 9% of methacrylic acid and 91% of ethylene, which varied in its degree of neutralization from 0 to about 20%), having MI=5-30 and a crystalline melting point of 93°-100° C.

Calcium carbonate (Pfizer, Superpflex 200®) was metered into a stream of pellets to be ground, and this mixture was subsequently mixed with the oversize recycle from the attrition mill. The resulting mixture was fed to the attrition mill. Calcium carbonate was added at the level of 15% in order to determine approximate maximum amounts retained on each product. Mill gap (clearance between teeth on counter-rotating plates) was set at 0.040 inch (1.01 mm) for Products C and D and 0.050 inch (1.27 mm) for Product E. No attempt was made to optimize gap by fine tuning in these runs. Air flow was about 2500 m³/kg. Sharpness of mill teeth was average to less than average. The screen size was 600 μm. The mill was run to determine the grinding rate limitation for each resin. Ambient temperature ranged from 29° to 35° C. Recycled air was not used. The results were:

1. Product C was limited to about 300 lbs/hr (136 kg/hr) by power to the mill plates (50 hp per plate available). Retained calcium carbonate was about 8.5%.
2. Product D was limited to about 320 lbs/hr (145 kg/hr) by power to the mill plates (50 hp per plate available). Retained calcium carbonate was about 9%.
3. Product E was limited to about 320-350 lbs/hr (145-159 kg/hr) by excessive agglomeration (mill exit temperature) at 80% power load to plates. Retained calcium carbonate was about 8%.

EXAMPLE 4

The polymer pellets subjected to grinding were:
Product F (a copolymer of 72% of ethylene and 28% of vinyl acetate), having MI ranging from 20 to 40 and a crystalline melting range of 65°-75° C.

Ambient air (at intake) ranged from 29° to 35° C. Air flow was about 1030 m³/kg. The experiment was done as in Example 3 above (mill gap at 0.050 inch [1.27 mm]). The results were:

Product F was ground at 620-690 lbs/hr (281-313 kg/hr) to a particle size through a 600 μm screen; the rate was limited only by the capacity of the feeding equipment. Retained calcium carbonate was 5.7%.

EXAMPLE 5

The polymer pellets subjected to grinding were Product E (see Example 3). Calcium carbonate (Pfizer, Superpflex 200®) was fed at 8%. Freshly recut, sharpened mill plates were used. Ambient air (intake) temperature ranged from 22° to 35° C. Mill gap was adjusted to 0.048 inch (1.22 mm) to achieve minimum oversize recycle to the Wedco special mill. Other conditions were as in Example 3. The objects of the experiment were to obtain higher grinding rates than in Example 3, and to produce a product having higher flow and bulk density.

The results were: Rates greater than 500 lbs/hr (227 kg/hr) were sustained for the production of over 10,600 kg of ground ionomer of a particle size through a 600 μm screen.

Product flow was related to the temperature of ground product; the latter was specified (at 59°-62° C.) for controlling flow to 28-33 sec/100 g (ASTM D1895-61T, 1961 issue). Temperature of ground product was maintained by operating at sufficient grinding rate (rates increased as ambient temperature decreased and vice versa). Product bulk density in this example was 14% higher than that obtained in Example 3. The retained calcium carbonate was about 6-7% in the finished product.

EXAMPLE 6

The polymer pellets subjected to grinding were Product E (see Example 3). Calcium carbonate (Pfizer, Superpflex 200®) was fed at 8-9%. Freshly cut, sharpened mill plates were used. Ambient air (intake) temperature ranged from 10° to 26° C. Mill gap was adjusted to obtain oversize recycle from 3-12% (as required) to preheat the mill feed for the desirable attained results. Preheated feed decreases the energy required in the attrition grinding step. A portion of the heated effluent air was recycled to the mill's air intake in order to maintain ground product temperature above 62° C. and below agglomeration temperature. Total air flow through the mill was about 830 m³/kg polymer.

The results were: Rates above 850 lb/hr (387 kg/hr) were observed for ground product having a particle size through a 600 μm screen and a powder flow (ASTM D1895-61T, 1961 issue) of 18-26 sec/100 g. The retained calcium carbonate was about 7-8% in the finished product.

EXAMPLES 7-15

Additional grinding experiments were run with various polymeric materials under the same general conditions as described above. All runs were made at a temperature of about 30° C., except in Example 11, which was carried out at about 60° C. The results are summarized in the following Table: Unless otherwise indicated, multiple entries in the third column indicate separate runs.

TABLE

| Example | Polymer | Grinding aid and amount (%) | Screen Size opening (μm) | Production rate (kg/hr.) |
|---|---|---|---|---|
| 7 | vinylidene fluoride/hexafluoropropylene copolymer | CaCO₃, 10 | 775 | 455 |
| | | High density polyethylene, 20 | 775 | 455 |
| | | Polytetrafluoroethylene, 10 | 775 | 455 |
| 8 | poly(butylene glycol/polyethylene ether terephthalate) | CaCO₃, 9 | 650 | 455 |
| | | CaCO₃, 9 | 300 | 318 |
| | | Polytetrafluoroethylene, 9 | 650 | 455 |
| 9 | copolymer of tetrafluoroethylene with tetrafluoro-2-[trifluoro-1'-(trifluoromethyl)-2'-(trifluoroethyleneoxy)ethoxy]-ethanesulfonyl fluoride | Polytetrafluoroethylene, 10 | 650 | 455 |
| | | High density polyethylene, 10 | 650 | 455 |
| 10 | partial Zn salt of an ethylene/methacrylic acid copolymer | CaCO₃, 9 | 300 | 91 |
| 11 | ethylene/methacrylic acid copolymer | CaCO₃, 9 | 300 | 136 |
| | | High density polyethylene, 18 + CaCO₃, 2 | 300 | 136 |
| 12 | ethylene/vinyl acetate copolymer | CaCO₃, 9 | 300 | 318 |
| | | High density polyethylene, 20 | 300 | 318 |
| 13 | polyoxymethylene | CaCO₃, 9 | 300 | 341 |
| 14 | chlorinated polyethylene | CaCO₃, 9 | 650 | 410 |
| | | polytetrafluoroethylene, 10 | 650 | 410 |
| 15 | an amorphous copolyamide | polyoxymethylene, 10 | 650 | 91 |

We claim:

1. A process for grinding to a particle size of less than about 1 mm in diameter a soft and tacky polymeric material in the presence of a grinding aid in an attrition mill having counter-rotating grinding elements adjustably spaced apart, said process comprising the following steps:
   (a) introducing polymer pellets and a grinding aid into the grinding area of an attrition mill having counter-rotating grinding elements operating at a combined tip speed of at least 170 m/sec, while passing air through the mill at a flow rate of at least about 350 m³ per kg of polymer throughput, the amount of grinding aid being about 5-20% based on the weight of the polymer;
   (b) grinding the polymer at a temperature such that the surfaces of polymer particles melt, thus allowing the grinding aid to well adhere thereto and minimizing the amount of grinding aid to be disposed of, at a mill setting such that about 1-40% of the polymer fed to the mill has a particle size of at least about 1 mm;
   (c) removing ground polymer from the grinding area by carrying it away with the stream of air;
   (d) separating ground polymer material having a smaller particle size of less than about 1 mm from the material having a larger particle size of at least 1 mm;
   (e) collecting the smaller particle size material and recycling the larger particle size material to the polymer fed to the mill, the recycled polymer being at a temperature such that it preheats the polymer fed to the mill to a selected temperature at or above ambient;
   (f) removing with the stream of air most loose grinding aid from the grinding area and, optionally, recovering it; and
   (g) when the temperature of recycled polymer is insufficient to preheat the polymer fed to the mill to the desired temperature, recycling a portion of the air exiting from the mill to the incoming air.

2. The improvement of claim 1 wherein the amount of grinding aid is 6-12% based on the weight of the polymer.

3. The improvement of claim 2 wherein the grinding aid is calcium carbonate.

4. The improvement of claim 1 wherein the polymer is selected from the class consisting of ethylene/vinyl acetate copolymers, ethylene/vinyl acetate/carbon monoxide terpolymers, ethylene/methacrylic acid copolymers and their salts, ethylene/methyl methacrylate copolymers, ethylene/n-butyl acrylate/carbon monoxide terpolymers, copolyamides, copolyetheresters, chlorinated polyethylene, polyoxymethylene, vinylidene fluoride/hexafluoropropylene copolymer and tetrafluoroethylene/tetrafluoro-2-[trifluoro-1'-(trifluoromethyl)-2'-(trifluoroethyleneoxy)ethoxy]ethanesulfonyl fluoride.

5. The improvement of claim 4 wherein the amount of grinding aid is 6–12% based on the weight of the polymer.

6. The improvement of claim 5 wherein the grinding aid is calcium carbonate.

7. The improvment of claim 1 wherein portion of air exiting from the attrition mill is recirculated to the polymer feed.

8. The improvement of claim 1 wherein the amount of polymer recycled as oversize material is about 1–20% of the polymer fed to the mill.

9. The improvement of claim 1 wherein the particle size of the ground polymer is less than about 0.5 mm.

10. The improvement of claim 1 wherein the particle size of the grinding aid is about 75 μm.

11. The improvement of claim 1 wherein the grinding aid is an organic polymer powder, the polymer having a melting temperature higher than the grinding temperature, so that the polymer powder remains free-flowing.

12. The improvement of claim 11 wherein the grinding aid is selected from the class consisting of polytetrafluoroethylene, high density polyethylene, polyvinyl chloride, polypropylene, poly(hexamethylene adipamide), and poly(ethylene terephthalate).

13. The improvement of claim 1 wherein the grinding aid is an inorganic powder.

14. The improvement of claim 13 wherein the grinding aid is selected from the class consisting of silica, calcium carbonate, zinc oxide, magnesium oxide, and clay.

* * * * *